A. B. OGDEN.
APPARATUS FOR DRYING THE SLUDGE OR SOLID MATTER RECOVERED FROM SEWAGE.
APPLICATION FILED JULY 13, 1914.

1,135,390.

Patented Apr. 13, 1915.

2 SHEETS—SHEET 1.

WITNESSES:
John C. Sanders
Albert F. Heuman

INVENTOR:
Abraham Buckley Ogden
BY
Thu Wallace White
ATT'Y

A. B. OGDEN.
APPARATUS FOR DRYING THE SLUDGE OR SOLID MATTER RECOVERED FROM SEWAGE.
APPLICATION FILED JULY 13, 1914.

Patented Apr. 13, 1915.

UNITED STATES PATENT OFFICE.

ABRAHAM BUCKLEY OGDEN, OF URMSTON, MANCHESTER, ENGLAND.

APPARATUS FOR DRYING THE SLUDGE OR SOLID MATTER RECOVERED FROM SEWAGE.

1,135,390.

Specification of Letters Patent.

Patented Apr. 13, 1915.

Application filed July 13, 1914. Serial No. 850,678.

*To all whom it may concern:*

Be it known that I, ABRAHAM BUCKLEY OGDEN, a subject of the King of Great Britain and Ireland, residing at 35 Gloucester road, Urmston, Manchester, in the county of Lancaster, England, have invented new and useful Improvements in or Relating to Apparatus for Drying the Sludge or Solid Matter Recovered from Sewage, of which the following is a specification.

This invention relates to apparatus for drying the sludge or solid matter recovered from sewage.

The sludge or solid sewage matter recovered from sewage is generally pressed into blocks or cakes to express part of the moisture from it, and these blocks or cakes are afterward dried to remove the whole or the greater part of the remaining moisture and subsequently ground or pulverized for use as a fertilizer or artificial manure.

The object of the present invention is to provide an improved and simple apparatus for the efficient drying of the blocks or cakes of sludge or solid sewage matter.

I will fully describe the invention with reference to the accompanying drawings wherein—

Figure 1:
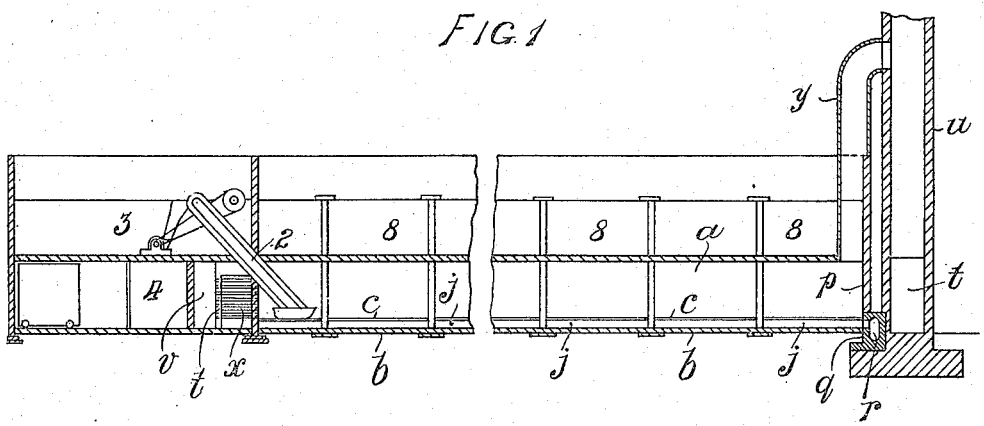
Figure 2:
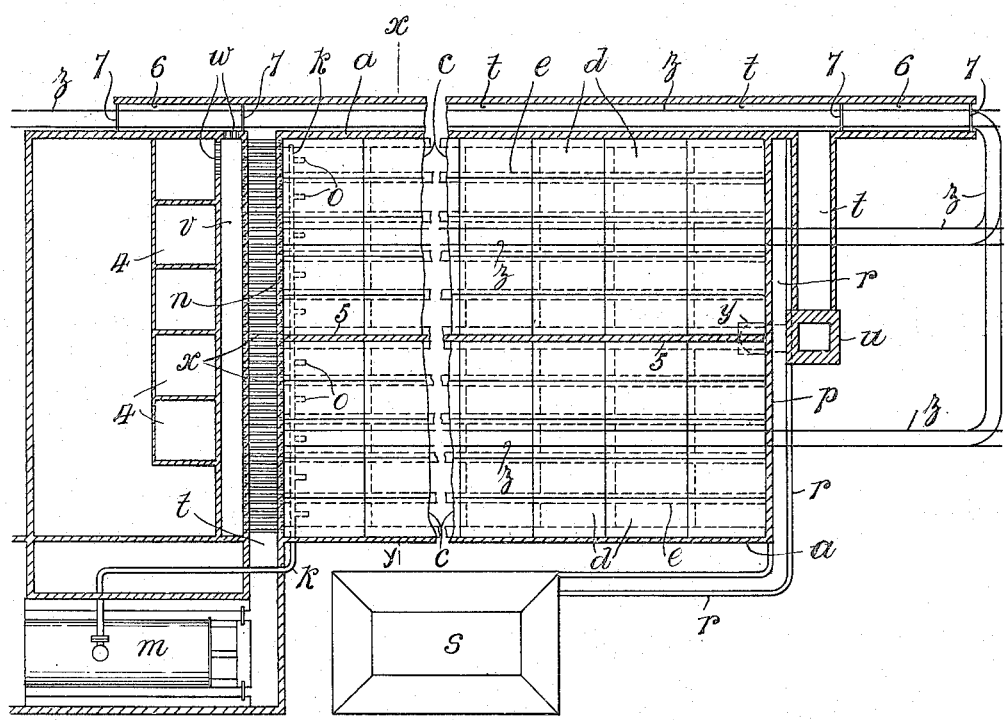
Figure 3:
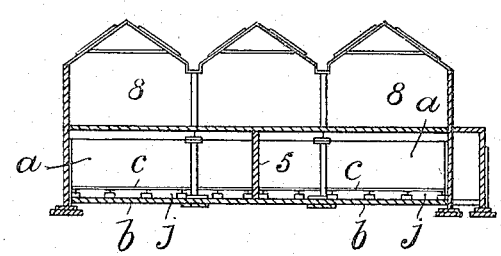
Figure 4:
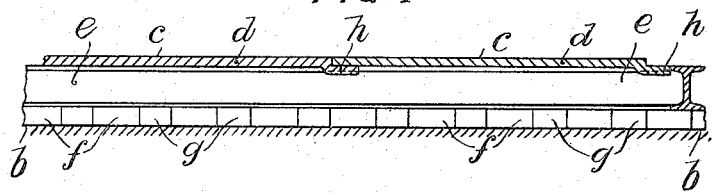
Figure 5:
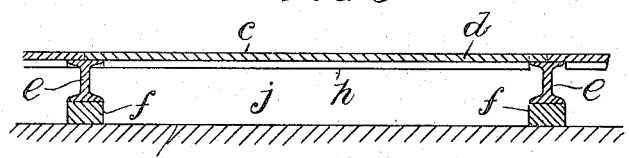
Figure 6:
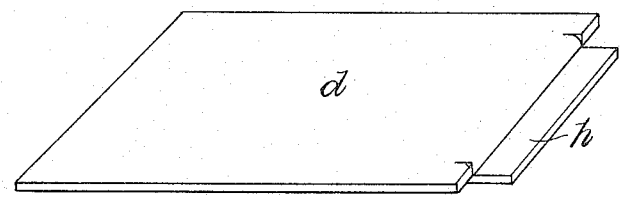

Figure 1 is a longitudinal section of a drying apparatus in accordance therewith. Fig. 2 is a sectional plan of Fig. 1 and Fig. 3 is a transverse section on the line X—Y in Fig. 2. Fig. 4 is a part enlarged longitudinal section and Fig. 5 a part transverse section more clearly illustrating the construction of the floor on which the sludge or solid matter is dried, and Fig. 6 is a perspective view of one of the metal plates used in the construction of the floor.

Referring to the drawings, $a$ is a drying chamber having a concrete floor $b$ at a suitable distance above which (say from six to nine inches) is a second or false floor $c$. The floor $c$ may conveniently be composed of metal plates $d$ (Figs. 4 to 6) resting on girders $e$ supported on rows of bricks $f$, the bricks being spaced apart so that the spaces between the rows and girders communicate with each other by the intervening spaces $g$. The plates $d$ art preferably provided with joggled lips $h$ which lie between the pairs of girders and allow of the plates being riveted or bolted together with their upper surfaces flush with each other. The plates $d$ may also be riveted or bolted to the girders $e$, or they may rest loosely thereon. To the space $j$ between the floors $b$ and $c$ steam is admitted by means of a pipe $k$ leading from a boiler $m$ and extending across said space at the end $n$ of the chamber $a$, and provided with one or more branches or nozzles $o$ opening between each pair of girders $e$ and rows of bricks $f$. By reason of the openings $g$ (Figs. 4 and 5) the steam admitted by the branches or nozzles $o$ can circulate through the whole of the space $j$ between the floors $b$ and $c$. The floor $b$ has a slight fall toward the opposite end $p$ of the chamber $a$, and openings $q$ (Fig. 1) are provided in the end wall to convey the condensation from the space $j$ to a conduit $r$ which may lead to reservoir $s$. The flue $t$ from the furnace of the boiler $m$ is carried across the end $n$ of the chamber $a$, along the side of same, and across the other end $p$ to the chimney stack $u$, preferably situated at or about the middle thereof. Next to the flue $t$ where it passes across the end $n$ of the chamber $a$, I provide an air chamber $v$ which is open to the atmosphere by openings $w$ in its walls, and across the flue $t$ I fit above the level of the upper or false floor $c$, pipes $x$ so that air from the chamber $v$ passes through the pipes $x$, thereby becoming heated, and issues into the chamber $a$. If desired the air may be supplied to the chamber $v$ by a fan or blower. At the end $p$ of the chamber $a$ an air outlet or flue $v$ leading to the chimney stack $u$ is provided.

The sludge or solid sewage matter to be dried is run into the chamber $a$ on wagons traveling on tracks $z$ and is spread on the floor $c$, the drying being effected by the heat from the steam admitted to the space $j$ between the floors $b$ and $c$ and the hot air issuing into the chamber $a$ through the pipes $x$. The dried material is conveyed by elevators 2 to grinding mills 3, which grind or pulverize it and deliver it to bins 4 for bagging or removal as required.

The chamber $a$ is preferably divided by one or more partitions 5 into two or more smaller chambers in order that the drying may be continuous, one of said smaller chambers being discharged of its dried material and recharged with material to be dried, while the material in the other chamber or chambers is being dried.

The wagons containing the sludge or sewage matter to be dried may, before being, and while waiting to be, run into the chamber $a$, be run through, and remain in, the portion of the flue *t* which extends along the side of the chamber, and the sludge or sewage matter thus be subjected to a partial drying before being dried in the chamber *a*. To this end the side portion of the flue *t* may be provided with locks 6, fitted with doors 7, and an endless cable or other suitable means will be employed for traveling the wagons through the flue. A second chamber 8 may be provided above the drying chamber *a*, which chamber 8 may be adapted, similarly to the chamber *a*, as a second drying chamber, or it may be used as a storage chamber, or for other purposes, or be dispensed with.

Having thus described my invention, what I claim as new and desire to secure by Letters Patent is:—

1. In a kiln or apparatus for drying the sludge or solid sewage matter recovered from sewage, the combination of a drying chamber, a sloping floor in said chamber, a second or false floor above said sloping floor, a steam pipe extending across one end of the space between said floors and provided with nozzles opening to said space, a condensation collecting conduit at the other end of said space, a furnace flue extending across one end of said drying chamber, an air chamber alongside said flue, means for admitting air to said air chamber, and air pipes extending across said flue from said air chamber to said drying chamber above the second or false floor therein.

2. In a kiln or apparatus for drying the sludge or solid sewage matter recovered from sewage, the combination of a drying chamber, a floor in said chamber, a second or false floor in said chamber above said floor constituted by metal plates supported by rows of spaced bricks, which divide the space between the two floors into inter-communicating passages, and each of said metal plates being provided with a joggled edge to receive the adjacent edge of the next plate, means for admitting steam to said space between the floors, and means for admitting hot air to said chamber above said second or false floor.

3. In a kiln or apparatus for drying the sludge or solid sewage matter recovered from sewage, the combination of a drying chamber, a sloping floor in said chamber, a second or false floor above said sloping floor, a steam pipe extending across one end of the space between said floors and provided with nozzles opening to said space, a condensation collecting conduit at the other end of said space, a furnace flue extending across one end of said drying chamber, an air chamber alongside said flue, means for admitting air to said air chamber, air pipes extending across said flue from said air chamber to said drying chamber above said second or false floor, an extension of said flue extending along one side of the drying chamber, a track in said flue extension for the trucks conveying the material to be dried and ingress and egress locks at the ends of said flue extension.

In testimony whereof I have signed my name to this specification in the presence of two subscribing witnesses.

ABRAHAM BUCKLEY OGDEN.

Witnesses:
 EDMUND WARD PATTISON,
 HAROLD WALKER.

Copies of this patent may be obtained for five cents each, by addressing the "Commissioner of Patents, Washington, D. C."